United States Patent
Maguire et al.

(10) Patent No.: US 7,453,041 B2
(45) Date of Patent: Nov. 18, 2008

(54) METHOD AND APPARATUS FOR COOLING A SUPERCONDUCTING CABLE

(75) Inventors: James F. Maguire, Andover, MA (US); Michael McCarthy, Shrewsbury, MA (US)

(73) Assignee: American Superconductor Corporation, Devens, MA (US)

(*) Notice: Subject to any disclaimer, the term of this patent is extended or adjusted under 35 U.S.C. 154(b) by 420 days.

(21) Appl. No.: 11/154,344

(22) Filed: Jun. 16, 2005

(65) Prior Publication Data

US 2006/0283620 A1  Dec. 21, 2006

(51) Int. Cl.
*H01B 12/00* (2006.01)
(52) U.S. Cl. .................................... 174/15.4; 505/230
(58) Field of Classification Search ....... 174/15.4–15.5, 174/125.1; 505/230–232
See application file for complete search history.

(56) References Cited

U.S. PATENT DOCUMENTS

| | | | | |
|---|---|---|---|---|
| 3,946,141 | A | * | 3/1976 | Schmidt ................... 174/11 R |
| 4,395,584 | A | | 7/1983 | Ries |
| 4,857,675 | A | | 8/1989 | Marancik et al. |
| 5,073,679 | A | | 12/1991 | Bencharab et al. |
| 5,298,679 | A | | 3/1994 | Wu et al. |
| 5,908,812 | A | | 6/1999 | Cotton et al. |
| 6,154,103 | A | | 11/2000 | Scharen et al. |
| 6,334,313 | B1 | | 1/2002 | Nagaishi et al. |
| 6,354,087 | B1 | | 3/2002 | Nakahara et al. |
| 6,590,471 | B1 | | 7/2003 | Scharen et al. |
| 6,633,003 | B2 | | 10/2003 | Nassi et al. |
| 6,732,536 | B1 | | 5/2004 | Bonaquist et al. |
| 2003/0183410 | A1 | | 10/2003 | Sinha et al. |

FOREIGN PATENT DOCUMENTS

| | | | |
|---|---|---|---|
| EP | 0 786 783 A1 | | 12/1996 |
| EP | 0 786 783 B1 | | 12/1996 |
| EP | 0 849 550 A1 | | 7/1997 |
| EP | 0 849 550 B1 | | 7/1997 |
| EP | 1 026 755 A1 | | 5/1999 |
| JP | 4032108 | | 2/1992 |
| JP | 7201233 | | 8/1995 |

* cited by examiner

*Primary Examiner*—Jeremy C Norris
(74) *Attorney, Agent, or Firm*—Daly, Crowley, Mofford & Durkee, LLP

(57) ABSTRACT

A superconducting cable assembly includes a first annular passage disposed concentrically around the superconducting cable and having first and second ends and an inlet, a second annular passage disposed concentrically around the first passage and having first and second ends, wherein at least one of the first and second ends of the second passage is in communication with at least one of the first and second ends of the first passage, the second passage further having an outlet. A coolant provided by a cryogenic refrigeration system is directed through the inlet, passes through the first passage in a first direction, passes through the second passage in a second direction opposite to the first direction and exits the assembly through the outlet. With this arrangement, the superconducting cable is cooled to the critical temperature by coolant flowing through the first passage and the coolant flowing through the second passage intercepts ambient heat so as to act as a heat shield for the first passage.

18 Claims, 2 Drawing Sheets

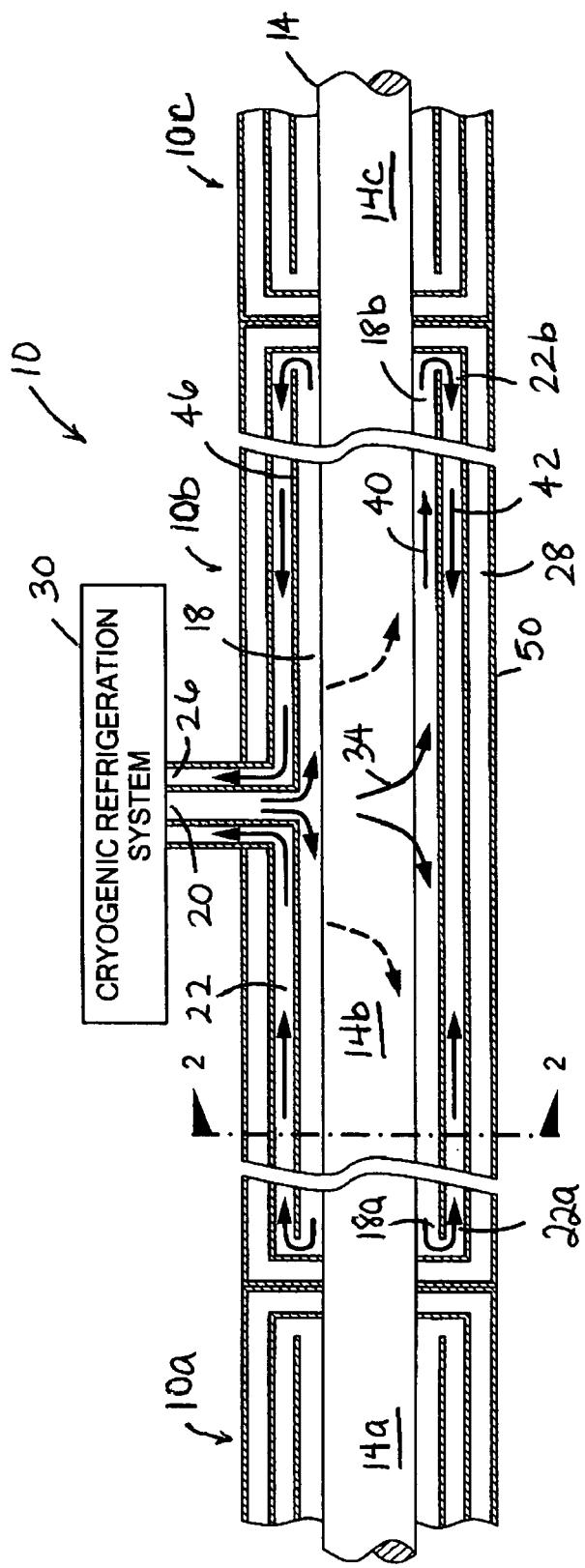
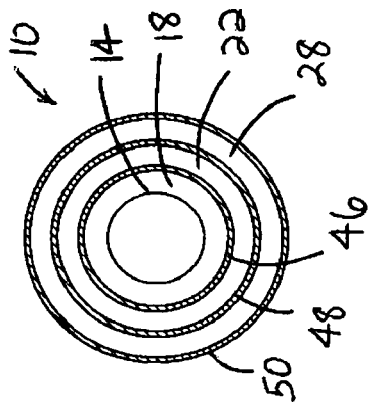
FIG. 1
FIG. 2

METHOD AND APPARATUS FOR COOLING A SUPERCONDUCTING CABLE

CROSS-REFERENCE TO RELATED APPLICATIONS

Not Applicable.

STATEMENT REGARDING FEDERALLY SPONSORED RESEARCH

Not Applicable.

FIELD OF THE INVENTION

The invention relates to superconducting cables and, more particularly to methods and apparatus for cooling a superconducting cable.

BACKGROUND OF THE INVENTION

Superconductivity refers to a state of materials in which the electrical resistance becomes zero when the material is cooled to a sufficiently low temperature, referred to as the critical temperature. One type of superconductor, referred to as a high temperature superconductor (HTS), has a critical temperature in excess of the boiling point of liquid nitrogen of 77° K at atmospheric pressure.

The use of superconductive materials and, in particular, superconducting cables, is advantageous because of the elimination of resistive losses. As a result, superconducting cables are being designed, built and tested for use in industrial applications, such as power transmission systems. While the lengths of superconducting cables used in power transmission systems have been relatively short while the merits of their use in this application is confirmed, such as on the order of less than a kilometer, it is anticipated that future applications will require much greater superconducting cable lengths, even in some cases in excess of 600 kilometers.

HTS cables are comprised of a core, such as a copper core, around which superconducting tape and wires are wrapped. A dielectric material surrounds the wires and a coolant, such as liquid nitrogen, flows through a vessel or tube over the dielectric providing both cooling and additional dielectric insulation for the conductor. This vessel or tube is then surrounded by an additional layer of thermal insulation (vacuum or other material) to minimize the rate of thermal input. In cold dielectric superconducting cables, the dielectric is on the inside of the area through which the coolant flows.

Conventionally, cryogenic refrigeration systems are used to cool cold dielectric superconducting cables to the critical temperature. Such systems contain a compressor for providing a refrigerant, or coolant, such as liquid nitrogen, at the critical temperature. The liquid nitrogen flows through an area disposed around the dielectric material, entering the area at one end of the cable and exiting the area at the opposite end of the cable to be returned to the cryogenic refrigeration system through a tube external to the superconducting cable assembly.

While this arrangement may be sufficient for cooling superconducting cables having short lengths on the order of up to 1 kilometer, cooling longer cable lengths requires additional cryogenic refrigeration systems because of the cooling capacity of such systems. Thus, many cryogenic refrigeration systems would be required along the length of the cable in order to maintain the entire cable length at the critical temperature. This arrangement becomes costly due to the cost of the additional refrigeration systems.

SUMMARY OF THE INVENTION

According to the invention, a superconducting cable assembly includes a superconducting cable, a first annular passage disposed concentrically around the superconducting cable and having first and second ends and an inlet, and a second annular passage disposed concentrically around the first passage and having first and second ends, wherein at least one of the first and second ends of the second passage is in communication with at least one of the first and second ends of the first passage, the second passage further having an outlet. The assembly further includes an outer area disposed concentrically around the second passage.

A coolant provided by a cryogenic refrigeration system is directed through the inlet, flows through the first passage, enters the second passage, flows through the second passage, and exits the assembly through the outlet. The coolant flows through the first passage in a first direction and flows through the second passage in a second direction, opposite to the first direction. In one illustrative embodiment, the first and second passages are adjacent to each other.

The walls of the first passage are comprised of a material having a thermal conductance below a predetermined level in order to permit a temperature differential between the coolant in the first passage and the coolant in the second passage. In one illustrative embodiment, the first passage walls are comprised of a nylon polymer.

With this arrangement, the superconducting cable is cooled to the critical temperature by the coolant flowing through the first passage and the coolant flowing through the second passage intercepts ambient heat so as to act as a heat shield for the first passage. Because of the thermal insulation qualities provided by the coolant in the second passage, a longer length of HTS cable can be cooled with the same cryogenic refrigeration system than otherwise possible. Stated differently, the described arrangement can reduce the total number of refrigeration systems for a given length of cable. In addition, this arrangement allows for the cooling of a single cable system without the need for a separate return line.

The outer area provides thermal insulation and may, for example, be a vacuum area. Optionally, the first and second passages are annular in shape. The inlet and outlet may be disposed adjacent to each other, such as with the outlet disposed concentrically around the inlet. Illustrative coolants for use with the superconducting cable assembly include liquid nitrogen, natural gas, gaseous helium, hydrogen, and neon.

Also described is a superconducting cable assembly comprising a superconducting cable having a plurality of segments and a plurality of cooling assemblies, each associated with a respective one of the cable segments and having the above-described form. Thus, each of the cooling assemblies includes a first passage disposed concentrically around the respective cable segment, a second passage disposed around the first passage and in communication with the first passage, and an outer area disposed around the second passage.

According to a further aspect of the invention, a method for cooling a superconducting cable includes passing a coolant from a cryogenic refrigeration system in a first direction through a first annular passage disposed concentrically around the superconducting cable and passing the coolant from the first annular passage through a second annular passage disposed concentrically around the first annular passage. The coolant flows through the second passage in a second direction opposite to the first direction.

BRIEF DESCRIPTION OF THE DRAWINGS

The advantages and aspects of the present invention will be more fully understood in conjunction with the following detailed description and accompanying drawings, wherein:

FIG. 1 is a cross-sectional view of a superconducting cable assembly with cooling according to the invention;

FIG. 2 is an alternative cross-sectional view of the superconducting cable assembly of FIG. 1.

DETAILED DESCRIPTION

Figure 3:
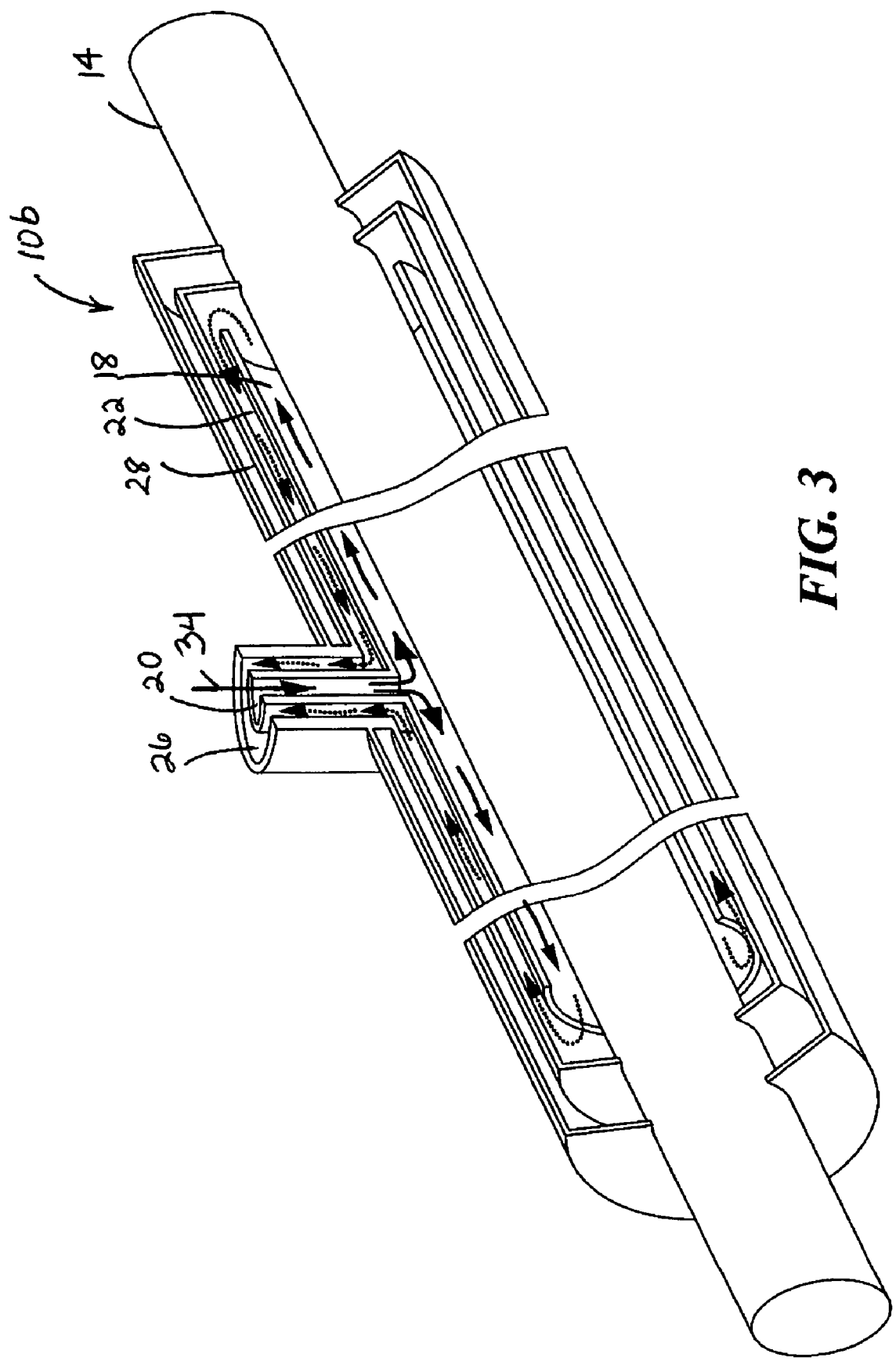
FIG. 3 is an enlarged perspective view of a portion of the superconducting cable assembly of FIG. 1.

Referring to the superconducting cable assembly 10 of FIG. 1 and to the cross-sectional view of FIG. 2, the assembly 10 includes a superconducting cable 14, a first passage 18 disposed concentrically around the superconducting cable, and a second passage 22 disposed concentrically around the first passage, with the first passage and the second passage adjacent to each other. The first passage 18 has a first end 18a and a second end 18b and the second passage 22 has a first end 22a in communication with the first end 18a of the first passage and a second end 22b in communication with the second end 18b of the first passage. The first passage 18 further has an inlet 20 and the second passage 22 has an outlet 26. An outer area 28 is disposed concentrically around the second passage 22, as shown. In the illustrated embodiment, the outer area 28 is a vacuum area that provides thermal insulation.

The inlet 20 is adapted to be coupled to a cryogenic refrigeration system 30 in order to receive a coolant 34 from the refrigeration system. The outlet 26 is also adapted to be coupled to the cryogenic refrigeration system 30 in order to return the coolant to the refrigeration system.

In use, the coolant 34 passes through the inlet 20, flows through the first passage 18, into the second passage 22, through the second passage and returns to the refrigeration system through the outlet 26. The coolant 34 flows through the first passage 18 in a first direction (indicated by arrow 40) and flows through the second passage 22 in a second direction (indicated by arrow 42), with the first direction being 180° opposite to the second direction, as shown.

With this arrangement, an effective scheme is provided for cooling the superconducting cable 14, since the second passage 22, in addition to providing a return path for the coolant to return to the refrigeration system 30, also provides a heat shield to insulate the superconducting cable from ambient heat. This is because the coolant flowing through the second passage intercepts heat from the ambient environment. The coolant in the second passage absorbs the ambient heat without raising the operating temperature of the cable 14. As a result, the present arrangement has lower fluid flow requirement than conventional superconducting cable cooling arrangements. For example, in a fully loaded cable, the mass flowrate of the cryogen can be reduced by approximately 20-30%. Alternatively, for the same fluid flow, a cryogenic refrigeration system used in connection with the present arrangement can cool a longer length of cable than otherwise possible.

The assembly walls 46 that separate the first passage 18 and the second passage 22 (i.e., the walls of the first passage) are comprised of a material having a thermal conductance of less than approximately 0.15 w/m²-K. With this arrangement, there is little heat transfer between the coolant flowing through the first passage 18 and the coolant flowing through the second passage 22 and thus, a temperature difference can be maintained between the two passages. Illustrative materials for the passage walls 46 include nylon polymers, epoxy composites, PTFE materials and vacuum spaces. The thickness of the walls 46 is on the order of 5 to 20 mm.

The superconducting cable 14 may be of any length. In embodiments in which the cable length is greater than a predetermined length, it is desirable to provide a plurality of cable assemblies 10a, 10b, . . . , each to cool a respective segment 14a, 14b, . . . of the cable, as shown in FIG. 1. This is because the coolant 34 warms as it flows along the length of the superconducting cable, so it is necessary to limit the length of the first passage accordingly. It is contemplated that each cable assembly 10a, 10b be less than approximately 3-5 kilometers. Thus, in applications requiring longer superconducting cables, the cable can be characterized as comprising a plurality of shorter segments 14a, 14b (although the cable 14 is not physically partitioned), with each segment having a respective first passage, second passage, and outer area arranged as described above. However, in applications in which the superconducting cable is relatively short, the entire cable length may be cooled with a single assembly of the form described above, as is shown in the perspective view of FIG. 3 in which the cable 14 is cooled with an assembly 10b. In applications in which the cable comprises a plurality of shorter assemblies 10a, 10b, . . . , mechanical spacers are used, such as may be on the order of approximately 2 to 3 meters long, to keep the assemblies concentric.

In the illustrated embodiment, the ends 18a, 18b of the first passage 18 are open to the respective ends 22a, 22b of the second passage 22, as shown. More generally, at least one of the ends 18a, 18b of the first passage is open to (i.e., in communication with) at least one of the ends 22a, 22b of the second passage. It will be appreciated that it is possible to alter the ends of the two passages, for example in terms of shape and/or size, while still permitting the coolant to flow therebetween. Also in the illustrated embodiment, the cable 14, the first passage 18, the second passage 22, and the outer area 28 are annular in shape. However, it will be appreciated that it is possible to achieve the advantages provided by the cable assembly 10 even if some or all of these elements are not annular.

It will also be appreciated that while the first passage 18 is shown to be disposed concentrically around the cable 14, the second passage 22 is shown to be disposed concentrically around the first passage, and the outer area 28 is shown to be disposed concentrically around the second passage, any or all of these elements may not be disposed precisely concentrically around the adjacent element. For example, it is possible for the longitudinal axis of the outer area 28 to be offset somewhat from the longitudinal axis of the second passage 22 and to still achieve the advantages provided by the cable assembly 10.

The superconducting cable 14 may take various forms. In one single-phase embodiment, the superconducting cable is comprised of a core 40, such as a copper core, around which superconducting tape and wires are wrapped. A dielectric sheath surrounds the wires in order to provide electrical insulation. In an alternative, three-phase embodiment, the superconducting cable 14 includes three individual cables, each with an outer dielectric sheath, an arrangement sometimes referred to as a triplex cable. It will be appreciated that the superconducting cable 14 may take other conventional forms, not shown. As another example, a three phase superconducting cable 14 may be provided with the three phases disposed concentrically with respect to the each other, an arrangement sometimes referred to as a triaxial cable. All of the above-described cables are characterized as cold dielectric superconducting cables, since the dielectric is on the inside of the cooled area and thus, the dielectric is cooled.

Various commercially available cryogenic refrigeration systems 30 are suitable for use with the cable assembly 10, such as systems provided by Air Liquide of Paris, France and Praxair, Inc. of Danbury, Conn. The coupling between the inlet 20 and the refrigeration system 30 and between the outlet 26 and the refrigeration system 30 may be a standard design vacuum insulated cryogenic transfer line.

The cryogenic coolant 34 may be a liquid or a gas. Suitable coolants include liquid nitrogen, natural gas, gaseous helium, hydrogen, liquified air, gas mixtures of oxygen and nitrogen in various percentages other than what occur in air, and neon. In one illustrative embodiment, the coolant 34 is liquid nitrogen and critical temperature of the superconducting cable is 77° K. In order to maintain the cable at 77° K, the liquid nitrogen is cooled to a temperature on the order of 64° K, thereby ensuring that the critical temperature is not exceeded even given a slight temperature rise along the length of the first passage 18. The temperature in the second passage could exceed the critical temperature by several degrees, for example, by as many as 20° K, depending on the insulating properties of the material or system chosen. Various arrangements for the inlet 20 and the outlet 26 are possible. In the illustrated embodiment, the inlet 22 and outlet 26 are disposed adjacent to each other. Specifically, the outlet 26 is disposed concentrically around the inlet 20. It will be appreciated however, that the outlet and inlet may be somewhat offset from one another.

Also, in the illustrated embodiment, the inlet 20 and the outlet 26 are substantially centered along the length of the cable 14 or cable segment 14b for example. However, it will be appreciated that the inlet and outlet may be moved nearer to one of the ends of the first passage.

The dimensions of the cable assembly elements will depend on the particular cable being cooled. In one illustrative embodiment, the cable 14 has a diameter on the order of 130 mm, the first passage 18 has a diameter on the order of 140 mm, the second passage 22 has a diameter on the order of 150 mm, and the outer area 28 has a diameter on the order of 180 mm. It will be appreciated by those of ordinary skill in the art that the particular dimensions of the assembly elements will depend on factors including, but not limited to, cable voltage rating, length, current rating and possible fault current levels.

The walls 48 of the second passage 22 and the walls 50 of the outer area 28 can be comprised of various materials. In one illustrative embodiment, the walls 48 of the second passage 22 and the walls 50 of the outer area 28 are comprised of stainless steel and have a thickness on the order of several millimeters. For example, the cable system described above would be suitable for a transmission voltage cable of ½ to ¾ kilometers in length and would operate with a maximum temperature of 70 K when provided with a mass flowrate of approximately 0.2 g/s of subcooled liquid nitrogen. This system would have an expected pressure drop of less that one bar between the inlet and outlet.

Having described the preferred embodiments of the invention, it will now become apparent to one of ordinary skill in the art that other embodiments incorporating their concepts may be used. These embodiments should not be limited to the disclosed embodiments, but rather should be limited only by the spirit and scope of the appended claims.

The invention claimed is:

1. A superconducting cable assembly comprising:
a superconducting cable;
a first passage disposed concentrically around the superconducting cable and having first and second ends and an inlet for receiving a coolant; and
a second passage disposed concentrically around the first passage and having first and second ends, wherein at least one of the first and second ends of the second passage is in communication with at least one of the first and second ends of the first passage, the second passage further having an outlet for returning the coolant.

2. The superconducting cable assembly of claim 1 wherein the first passage and the second passage are annular.

3. The superconducting cable assembly of claim 1 wherein the first passage and the second passage are adjacent to each other.

4. The superconducting cable assembly of claim 1 further including an outer area disposed concentrically around the second passage, and wherein the outer area is a vacuum area.

5. The superconducting cable assembly of claim 1 wherein the coolant flows through the first passage in a first direction and the coolant flows through the second passage in a second direction opposite to the first direction.

6. The superconducting cable assembly of claim 1 wherein the inlet is adapted to be coupled to a cryogenic refrigeration system in order to receive the coolant from the cryogenic refrigeration system and the outlet is adapted to be coupled to the cryogenic refrigeration system in order to return the coolant to the cryogenic refrigeration system.

7. The superconducting cable assembly of claim 6 wherein the coolant is selected from: liquid nitrogen, natural gas, gaseous helium, hydrogen, liquid air, combinations of gasses such as nitrogen and oxygen in various percentages, and neon.

8. The superconducting cable assembly of claim 1 wherein the outlet is disposed adjacent to the inlet.

9. The superconducting cable assembly of claim 8 wherein the outlet is disposed concentrically around the inlet.

10. The superconducting cable assembly of claim 1 wherein the inlet and the outlet are substantially centered between the first and second ends of the first passage.

11. The superconducting cable assembly of claim 1 wherein the inlet and the outlet are disposed adjacent to one of the first and second ends of the first passage.

12. The superconducting cable assembly of claim 1 wherein walls of the first passage are comprised of a material having a thermal conductance of less than approximately 0.15 $W/m^2$-K.

13. The superconducting cable assembly of claim 12 wherein the walls of the first passage are comprised of a material selected from: a nylon polymers, epoxy composites, PTFE materials and vacuum spaces.

14. A superconducting cable assembly comprising:
a superconducting cable comprising a plurality of cable segments;
a plurality of cooling assemblies, each associated with a respective one of the plurality of cable segments, wherein each cooling assembly comprises:
a first passage disposed concentrically around the respective cable segment and having first and second ends and an inlet for receiving a coolant; and
a second passage disposed concentrically around the first passage and having first and second ends, wherein at least one of the first and second ends of the second passage is in communication with at least one of the first and second ends of the first passage, the second passage further having an outlet for returning the coolant.

15. The superconducting cable assembly of 14 wherein the first passage and the second passage are annular.

16. The superconducting cable assembly of 14 further comprising an outer area disposed concentrically around the second passage, wherein the outer area is a vacuum area.

17. The superconducting cable assembly of 14 wherein the inlet is adapted to be coupled to a cryogenic refrigeration system in order to receive the coolant from the cryogenic refrigeration system and the outlet is adapted to be coupled to the cryogenic refrigeration system in order to return the coolant to the cryogenic refrigeration system.

18. A superconducting cable assembly comprising:
 a superconducting cable;
 a first annular passage disposed concentrically around the superconducting cable and having first and second ends and an inlet adapted to receive a coolant from a cryogenic refrigeration system, wherein the coolant flows in a first direction through the first annular passage;
 a second annular passage disposed concentrically around, and adjacent to the first annular passage and having first and second ends, wherein at least one of the first and second ends of the second annular passage is in communication with at least one of the first and second ends of the first annular passage, the second annular passage further having an outlet adapted to return the coolant to the cryogenic refrigeration system, wherein the coolant flows through the second annular passage in a second direction opposite to the first direction; and
 an outer area disposed concentrically around the second annular passage.

* * * * *